UNITED STATES PATENT OFFICE

2,160,947
VINYLIDENE CHLORIDE CO-POLYMERS

Robert C. Reinhardt, Midland, Mich., assignor to The Dow Chemical Company, Midland, Mich., a corporation of Michigan No Drawing.  Application August 1, 1938, Serial No. 222,449

11 Claims. (Cl. 260—80)

This invention relates to the products obtained by polymerizing together vinylidene chloride and a mono-halo-propene having the general formula

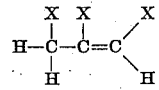

wherein one X is halogen and each other X is hydrogen.

The mono-halopropenes do not polymerize alone to any appreciable extent under ordinary conditions. They do form useful polymeric products when polymerized together with vinylidene chloride. For simplicity of expression in the description of my invention, the products so-obtained will be designated as co-polymers, and the process of polymerizing the mixture of monomers will be referred to as co-polymerization, but it is to be understood that the products are not co-polymers in the same sense as are the products obtained by polymerizing a mixture of compounds, each of which readily polymerizes alone.

I have discovered that resinous and plastic products possessing desirable physical characteristics can be produced by co-polymerizing vinylidene chloride and mono-halo-propenes having the general formula given above. Such mono-halo-propenes include 1-chloro-propene, 1-bromo-propene, 1-iodo-propene, 2-chloro-propene, 2-bromo-propene, 2-iodo-propene, allyl chloride, bromide and iodide. The products obtained vary in properties from hard co-polymeric resinous substances when a high proportion of vinylidene chloride is present relative to the mono-halo-propene to a gel-like material when the mono-halo-propene approaches the weight of the vinylidene chloride resin. The co-polymeric products are substantially insoluble in most common solvents at room temperature but dissolve at least partially in boiling dioxan and are dispersed to form compositions having the appearance of true solutions in boiling orthodichlorobenzene. The co-polymerization is advantageously carried out in the presence of catalysts capable of accelerating the normal rate of polymerization of the monomers being co-polymerized. A suitable catalyst is benzoyl peroxide or mixtures thereof with tetra-ethyl lead, and chloro-acetyl-chloride.

In preparing the new co-polymeric products, vinylidene chloride and the mono-halo-propene are mixed in the form of their monomeric liquids, together with a catalyst capable of accelerating the normal rate of polymerization of vinylidene chloride and the mixture is subjected to temperatures ordinarily in the range from room temperature up to about 100° C. The time required to effect an appreciable polymerization may be from a few hours to as much as 2 to 3 weeks, depending upon the temperature employed and upon the proportion of mono-halo-propene in the co-polymerizing mixture. In general, the greater the proportion of mono-halo-propene present in the mixture being co-polymerized, the slower is the co-polymerization reaction, under otherwise similar conditions.

The following examples illustrate the practice of my invention:—

EXAMPLE 1
ALLYL CHLORIDE

The following Tables I and II illustrate the results obtained in the co-polymerization of vinylidene chloride and allyl chloride. In each run recorded, there was taken 30 grams of a mixture of allyl chloride and vinylidene chloride in the proportions indicated in the tables together with a catalyst mixture comprising 0.12 gram of benzoyl peroxide, 0.10 milliliter of chloro-acetyl-chloride and 0.10 milliliter of tetraethyl lead. The duration of the experiments is noted in the tables together with figures indicating the yield of co-polymer obtained, the degree of polymerization, the softening point and decomposition temperatures of the product, and the chlorine analysis of the product, from which could be calculated the per cent of allyl chloride and vinylidene chloride co-polymerized therein. The runs in Table I were carried out at 30° C. while those recorded in Table II were run at 50° C.

Table I

| Run No. | Allyl chloride | Vinylidene chloride | Time, hrs. | Yield, grams | Percent polymerization | Softening point, °C. | Decomposition temperature, °C. | Percent chlorine | Percent co-polymerized allyl chloride | Appearance |
|---|---|---|---|---|---|---|---|---|---|---|
| 1 | 1.5 | 28.5 | 66 | 11.8 | 39 | 188 | 210 | 72.58 | 2 | White powder. |
| 2 | 4.5 | 25.5 | 66 | 8.2 | 27 | 177 | 210 | 71.66 | 5 | Do. |
| 3 | 9.0 | 21.0 | 66 | 4.9 | 16 | 143 | 199 | 66.23 | 26 | Do. |
| 4 | 15.0 | 15.0 | 475 | 0.5 | 1.7 | | | | | White, rubbery powder. |
| 5 | 21.0 | 9.0 | 475 | 0.0 | 0.0 | | | | | |

Table II

| Run No. | Allyl chloride | Vinylidene chloride | Time, hrs. | Yield grams | Percent polymerization | Product ||||  |
|---|---|---|---|---|---|---|---|---|---|---|
| | | | | | | Softening point, °C. | Decomposition temperature, °C. | Percent chlorine | Percent co-polymerized allyl chloride | Appearance |
| 1 | 1.5 | 28.5 | 66 | 27.5 | 92 | 182 | 210 | 71.70 | 5 | White powder. |
| 2 | 4.5 | 25.5 | 66 | 22.3 | 74 | 171 | 204 | 71.29 | 7 | Do. |
| 3 | 9.0 | 21.0 | 66 | 17.4 | 58 | 143 | 216 | 70.14 | 11 | Do. |
| 4 | 15.0 | 15.0 | 475 | 2.0 | 7 | | | | | Clear, very rubbery. |
| 5 | 21.0 | 9.0 | 475 | 0.0 | 0 | | | | | |

EXAMPLE 2

1-CHLORO-PROPENE

In a manner analogous to that described in Example 1, vinylidene chloride and 1-chloro-propene were subjected to co-polymerization. The amount of catalyst employed and the catalyst used were the same as when vinylidene chloride and allyl chloride were co-polymerized. The runs in Table III were carried out at 30° C. while those recorded in Table IV were run at 50° C.

Table III

| Run No. | 1-chloropropene | Vinylidene chloride | Time, hours | Yield, grams | Percent polymerization | Softening point, °C. | Decomposition, temperature, °C. | Percent chlorine | Percent co-polymerized 1-chloropropene |
|---|---|---|---|---|---|---|---|---|---|
| 1 | 1.5 | 28.5 | 123 | 25.2 | 84 | 188 | 204 | 72.91 | 1 |
| 2 | 4.5 | 25.5 | 123 | 14.6 | 49 | 188 | 199 | 73.00 | 1 |
| 3 | 9.0 | 21.0 | 123 | 8.4 | 28 | 182 | 199 | 72.76 | 2 |
| 4 | 15.0 | 15.0 | 123 | 4.9 | 16 | 177 | 199 | 72.47 | 2.5 |
| 5 | 21.0 | 9.0 | 123 | 2.4 | 8 | 177 | 199 | 69.80 | 13 |

Table IV

| Run No. | 1-chloropropene | Vinylidene chloride | Time, hours | Yield, grams | Percent polymerization | Softening point, °C. | Decomposition, temperature, °C. | Percent chlorine | Percent co-polymerized 1-chloropropene |
|---|---|---|---|---|---|---|---|---|---|
| 1 | 1.5 | 28.5 | 123 | 27.9 | 93 | 188 | 199 | 72.85 | 1 |
| 2 | 4.5 | 25.5 | 123 | 25.1 | 84 | 188 | 199 | 72.45 | 2.5 |
| 3 | 9.0 | 21.0 | 123 | 19.8 | 66 | 182 | 199 | 72.35 | 3 |
| 4 | 15.0 | 15.0 | 123 | 13.6 | 45 | 177 | 204 | 72.20 | 4 |
| 5 | 21.0 | 9.0 | 123 | 8.7 | 29 | 177 | 204 | 71.69 | 6 |

EXAMPLE 3

2-CHLORO-PROPENE

Mixtures of vinylidene chloride and 2-chloropropene were co-polymerized at 45° C. in the presence of 0.5 per cent by weight of benzoyl peroxide as a catalyst. The proportions of co-polymerizable compounds employed and the reaction conditions are noted in the following Table V, together with other pertinent data relative to the product.

Table V

| Run No. | Mixture of monomers || Time, hours | Polymerization, percent | Properties of co-polymers ||||
|---|---|---|---|---|---|---|---|---|
| | Vinylidene chloride, percent | 2-chloropropene, percent | | | Chlorine, percent | Vinylidene chloride, percent | 2-chloropropene, percent | Softening point, °C. |
| 1 | 100 | 0 | 26 | 47.2 | 73.2 | 100 | 0 | 181 |
| 2 | 87.3 | 12.7 | 26 | 23.2 | 72.1 | 96 | 4 | 166 |
| 3 | 73.3 | 26.7 | 26 | *12 | 69.7 | 87 | 13 | 137 |
| 4 | 57.9 | 42.1 | 26 | 6.8 | 67.0 | 77 | 23 | 121 |

* Approximate.

gous to that described in connection with the 1-chloro-propene products of Tables III and IV. Analysis showed the co-polymers to contain both chlorine and bromine, indicating that the product containing 1-bromo-propene polymerized together with the vinylidene chloride.

The co-polymers of vinylidene chloride and allyl chloride, properties of which are given in Tables I and II, and especially those prepared from approximately 30 per cent allyl chloride and 70 per cent vinylidene chloride in the mixture of monomers, are especially well adapted to use in the preparation of molded articles. It may be observed in Tables I and II that these co-polymers have softening points considerably lower than their decomposition temperatures and are therefore capable of being plastically deformed without thermal decomposition over a broad temperature range. The vinylidene chloride-allyl chloride co-polymers may also be used and have been found satisfactory in the preparation of extruded forms, filaments, and the like.

It is further noted in Tables I and II that when allyl chloride is mixed with less than an

EXAMPLE 4

A co-polymer of vinylidene chloride and 1-bromo-propene was made in a manner analoequal amount of vinylidene chloride and subjected to the conditions which cause polymerization when lesser quantities of allyl chloride are present, the allyl chloride appears to retard polymerization of the vinylidene chloride, since no appreciable amount of polymeric product of any kind is obtained.

All of the polymeric products obtained by the co-polymerization of vinylidene chloride and the 1-halo-propene, as described in Tables III and IV, were produced in the form of white powders which were insoluble in most common organic solvents at room temperature and dissolved only with difficulty in a small group of solvents at more elevated temperatures. These co-polymeric thermoplastic products have been found satisfactory for use in the preparation of molded articles, extruded forms, filaments, machined products, and the like.

The co-polymers of vinylidene chloride and 2-chloropropene reported in Table V are also useful for similar purposes, as they are readily deformed under pressure at moderate temperatures. The products obtained in the reported runs in Table V, were all white powders, adapted to use as molding powders without further treatment.

All of the co-polymers herein reported have, when first melted, an opaque appearance, but if heating is continued they gradually change to clear liquids which, on cooling, form translucent plastic bodies. The most useful co-polymers of vinylidene chloride and allyl chloride are those prepared from mixtures of these monomeric materials containing 50 per cent or more of vinylidene chloride by weight. The most useful co-polymers of vinylidene chloride and the 1-halo-propenes are prepared by polymerizing a mixture of the monomers wherein the amount of 1-halo-propene is at least as great as that of the vinylidene chloride. Owing to the relatively slow rate of polymerization of the 1-halo-propenes in the mixture as compared with that of vinylidene chloride, the co-polymers obtained contain more vinylidene chloride than 1-halo-propene. Similarly, the most satisfactory co-polymers of vinylidene chloride and 2-halo-propenes for use as molding plastics and the like, are those containing at least 50 per cent of co-polymerized vinylidene chloride.

When the mixture of monomeric vinylidene chloride and mono-halo-propene is subjected to polymerizing conditions for a period greater than that employed in the illustrative examples given herein, the proportion of mono-halo-propene in the product increases somewhat over that reported in the Tables I-V.

The properties of the co-polymers of vinylidene chloride and mono-halo-propene can be modified by adding thereto such modifying agents as plasticizers, coloring materials, fillers, heat stabilizers, and the like. These modifying agents may be added to the mixtures of monomers or may be incorporated in the co-polymer, depending upon the effect such materials may have upon the rate of co-polymerization or upon the finished co-polymer.

The invention has been illustrated with respect to the co-polymerization of vinylidene chloride with allyl chloride, 1-chloro- and 1-bromo-propene, and 2-chloro-propene. Similar products are obtained by the co-polymerization of vinylidene chloride and the other mono-halo-propenes previously listed.

This application is a continuation-in-part of my two prior applications, Serial Nos. 151,183 and 159,372, filed June 30, 1937, and August 16, 1937, respectively.

Other modes of applying the principle of my invention may be employed instead of those explained, change being made as regards the materials employed, provided the ingredients or steps stated by any of the following claims or the equivalent of such stated ingredients or steps be employed.

I therefore particularly point out and distinctly claim as my invention:

1. A product obtained by polymerizing together vinylidene chloride and up to an equal amount of a mono-halo-propene having the general formula

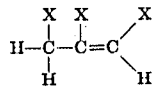

wherein one X is halogen and each other X is hydrogen.

2. A product obtained by polymerizing together vinylidene chloride and up to an equal amount of a 1-halo-propene.

3. A product obtained by polymerizing together vinylidene chloride and up to an equal amount of 1-chloro-propene.

4. A product obtained by polymerizing together vinylidene chloride and up to an equal amount of a 2-halo-propene.

5. A product obtained by polymerizing together vinylidene chloride and up to an equal amount of 2-chloro-propene.

6. A product obtained by polymerizing together an allyl halide and at least an equal amount of vinylidene chloride.

7. A product obtained by polymerizing together vinylidene chloride and allyl chloride, the amount of vinylidene chloride being at least 50 per cent of the total.

8. The process which comprises mixing monomeric vinylidene chloride with up to an equal amount of a mono-halo-propene having the general formula

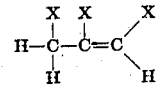

wherein one X is a halogen, and the other X's are hydrogen, in co-polymerizable proportions, together with a polymerization catalyst and subjecting the mixture to a temperature between room temperature and about 100° C. to cause co-polymerization.

9. The process which comprises heating together vinylidene chloride and up to an equal amount of a 1-halo-propene in the presence of a polymerization catalyst.

10. The process which comprises mixing allyl chloride with at least an equal amount of vinylidene chloride together with a polymerization catalyst and subjecting the mixture to a temperature between room temperature and about 100° C. to cause co-polymerization.

11. The process which comprises mixing vinylidene chloride and up to an equal amount of 2-chloro-propene together with a polymerization catalyst and subjecting the mixture to a temperature between room temperature and about 100° C. to cause co-polymerization.

ROBERT C. REINHARDT.